United States Patent [19]

Ruch et al.

[11] 3,988,660

[45] Oct. 26, 1976

[54] CIRCUIT FOR RECTIFYING A THREE-PHASE ALTERNATING SIGNAL

[75] Inventors: David E. Ruch; Lowell H. Koski, both of Goleta, Calif.

[73] Assignee: General Motors Corporation, Detroit, Mich.

[22] Filed: Aug. 1, 1975

[21] Appl. No.: 600,946

[52] U.S. Cl. ............................. 321/2; 321/9 R; 321/27 R
[51] Int. Cl.² ................................ H02M 5/293
[58] Field of Search ........................ 321/2–5, 321/9 R, 10, 27 R

[56] References Cited
UNITED STATES PATENTS

| | | | |
|---|---|---|---|
| 3,297,936 | 1/1967 | Ruch | 321/2 |
| 3,325,716 | 6/1967 | Gomi | 321/2 |
| 3,492,560 | 1/1970 | Welsh | 321/5 |
| 3,772,601 | 11/1973 | Smith | 321/5 |
| 3,846,695 | 11/1974 | Genuit et al. | 321/4 |

FOREIGN PATENTS OR APPLICATIONS

| | | | |
|---|---|---|---|
| 668,077 | 9/1964 | Italy | 321/27 R |
| 974,276 | 11/1964 | United Kingdom | 321/27 R |

Primary Examiner—William H. Beha, Jr.
Attorney, Agent, or Firm—Howard N. Conkey

[57] ABSTRACT

A circuit for converting a three-phase alternating voltage to a rectified unidirectional output voltage including a three-phase full-wave bridge rectifier rectifying the three-phase voltage and supplying a first unidirectional voltage and a line selector providing a second unidirectional voltage representing the summation of selected segments of the three-phase voltage. The first and second unidirectional voltages are summed via respective choppers, transformers and a rectifier to provide a unidirectional output voltage.

2 Claims, 12 Drawing Figures

Fig. 1

CIRCUIT FOR RECTIFYING A THREE-PHASE ALTERNATING SIGNAL

This invention relates to a rectifier for converting three-phase alternating waveforms to rectified unidirectional waveforms.

Many electronic applications require the conversion of the output of a three-phase primary power supply to some form of direct current. Existing approaches to such converters result in large and heavy devices which typically reflect excessively large harmonic currents back into the primary power supply distribution system. In many applications, weight and volume limitations restrict the amount of power that can be practically converted for electronic use. The size and weight of these existing converter units are not as much due to the rectifier elements and their heat sinks as it is to the input transformers used in such equipment which operate at the basic three-phase primary power frequency. These input transformers typically serve to provide isolation and voltage transformation between input and output and provide transformation of the three-phase primary power to multi-phase power in order to reduce current and voltage harmonics generated in the system.

It is the general object of this invention to provide an improved three-phase rectifier circuit which provides transformation of three-phase AC power to a rectified unidirectional voltage.

It is another object of this invention to provide a rectifier circuit for converting three-phase primary power to a rectified unidirectional voltage having reduced size and weight.

It is another object of this invention to provide a rectifier circuit for converting three-phase primary voltage to a rectified unidirectional voltage which minimizes the harmonic content of the currents drawn from the three-phase primary power supply.

Another object of this invention is to provide an improved rectifier circuit for transforming a three-phase AC voltage from a three-phase supply to a rectified unidirectional voltage wherein the currents drawn from the primary supply are an approximated sinusoidal waveform.

These and other objects of this invention may be best understood by reference to the following description of a preferred embodiment and the drawings in which.

Figure 1:
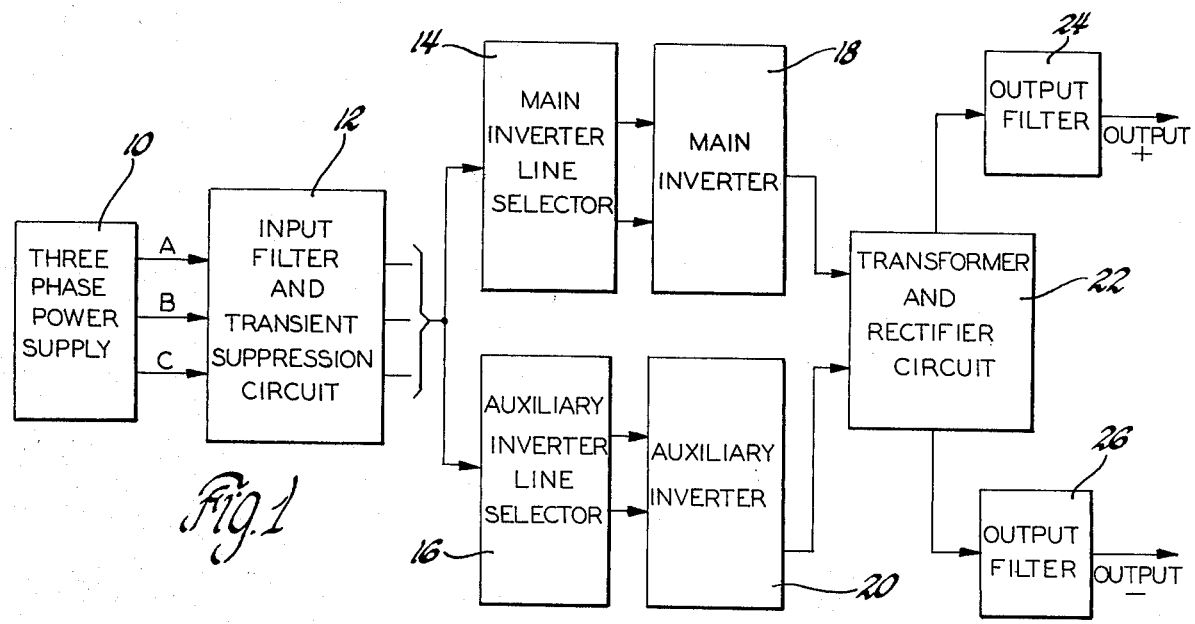
FIG. 1 is a block diagram of the rectifier system of this invention.

Referring to FIG. 1, a three-phase power supply 10 supplies a three-phase voltage having phases A, B, and C which are coupled to an input filter and transient suppression circuit 12. The input filter and transient suppression circuit 12 is a conventional circuit which functions to provide a low source impedance for the harmonic components of the currents drawn from the three-phase power supply 10 and functions to suppress high frequency transients which appear on the output of the three-phase power supply 10.

The three-phase voltage output of the input filter and transient suppression circuit 12 is coupled to a main inverter line selector 14 and to an auxiliary inverter line selector 16.

The main inverter line selector 14 couples selected segments of the three-phase voltage across the inputs of a main inverter 18. The voltage coupled to the main inverter comprises a main unidirectional supply voltage.

The auxiliary inverter line selector 16 couples selected segments of the three-phase voltage across the inputs of an auxiliary inverter 20. The voltage coupled across the inputs of the auxiliary inverter 20 comprises an auxiliary unidirectional supply voltage.

The main inverter and the auxiliary inverter function in synchronism to chop the respective unidirectional supply voltages coupled thereto and supply resulting high frequency outputs to a transformer and rectifier circuit 22. The transformer and rectifier circuit 22 sums the outputs of the main inverter 14 and the auxiliary inverter 16 and rectifies the resulting voltage to generate the system output comprising a rectified unidirectional voltage. This voltage may be filtered by conventional output filters 24 and 26, respectively.

Figure 2:
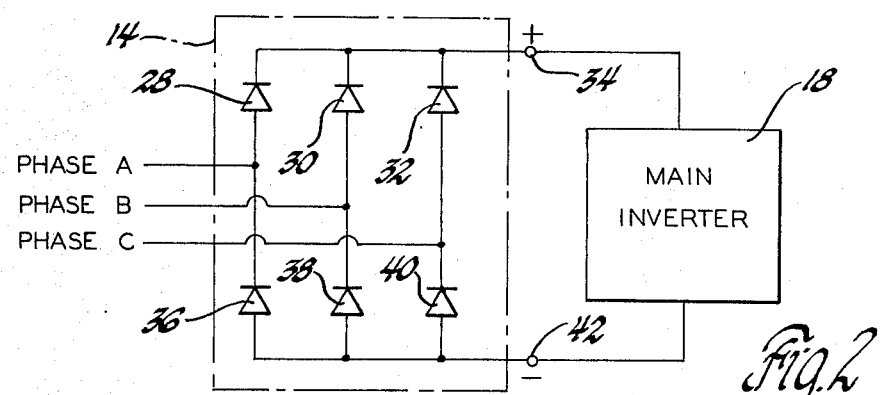
FIG. 2 is a schematic diagram of the main inverter line selector of FIG. 1.

Referring to FIG. 2, the main inverter line selector 14 takes the form of a three-phase full-wave bridge rectifier comprised of diodes 28, 30, and 32 having their cathodes coupled to a positive output terminal 34 and diodes 36, 38 and 40 having their anodes coupled to a negative output terminal 42. The cathodes of the diodes 36, 38, and 40 are coupled respectively to the anodes of the diodes 28, 30, and 32. Phase A, phase B, and phase C of the three-phase voltage from the three-phase power supply 10 are coupled respectively to the anodes of the diodes 28, 30, and 32.

Figure 7:
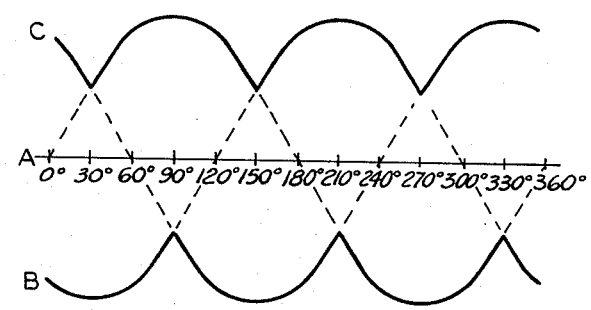
FIG. 7 is a waveform illustrating the portions of the three-phase supply voltage coupled to the main inverter by the main inverter line selector.
Figure 11:
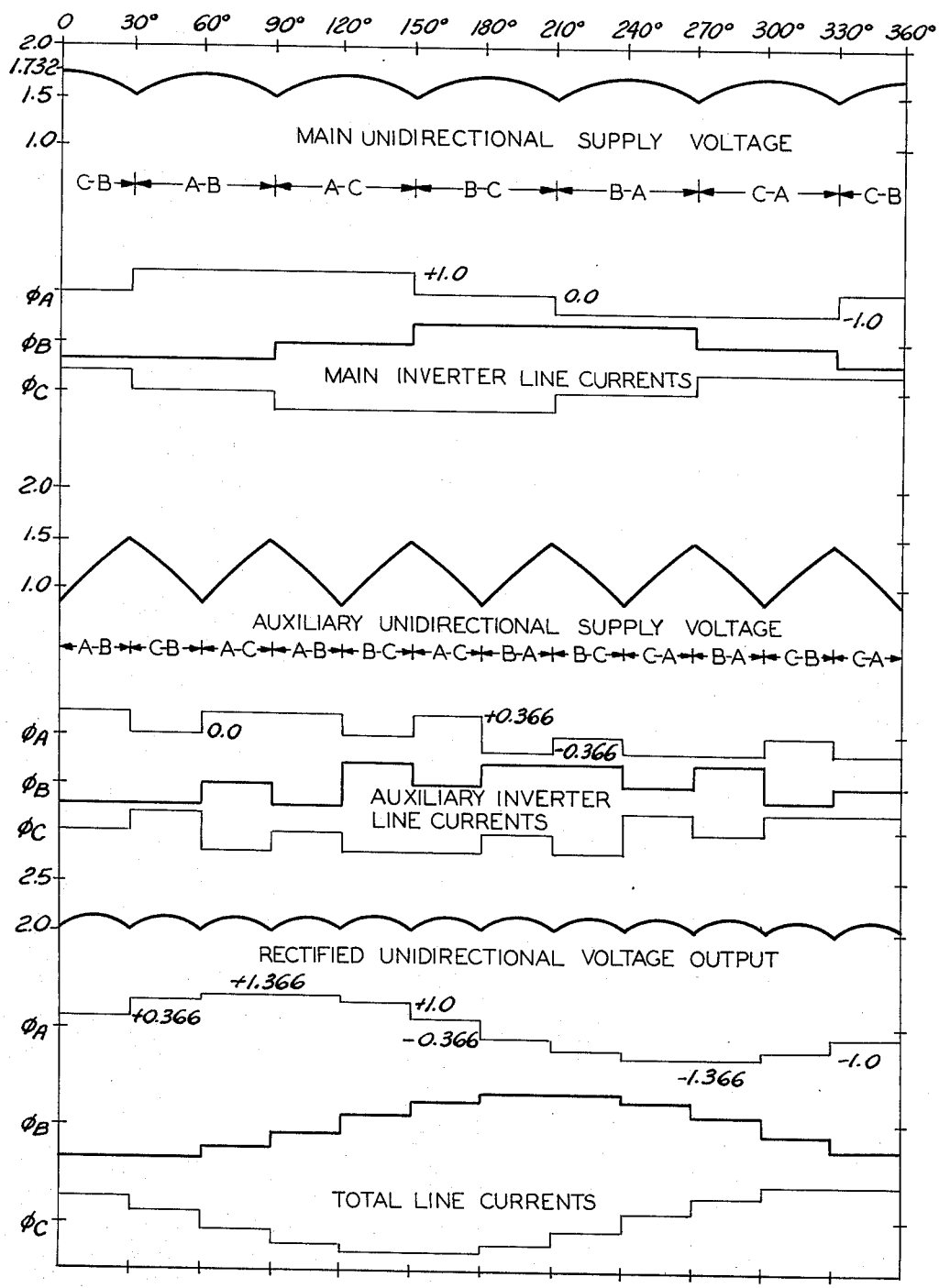
FIG. 11 is a diagram illustrating the main and auxiliary inverter input and output voltages and currents.

The output of the main inverter line selector 14 across the output terminals 34 and 42 is derived from the three-phase voltage from the three-phase power supply 10 and is coupled across the inputs of the main inverter 18. This output is a floating, unfiltered, full-wave, three-phase, rectified voltage hereinafter referred to as the main unidirectional supply voltage. The instantaneous magnitude of the main unidirectional supply voltage is the difference between the upper solid line and the lower solid line portions of the three-phase voltage waveforms of FIG. 7. The magnitude of the main unidirectional supply voltage from across the output terminals 34 and 42 is illustrated in FIG. 11. As can be seen in FIG. 11, the main unidirectional supply voltage peaks at 60° intervals of the three-phase voltage waveform of FIG. 7 beginning at 0°. The respective conduction periods of the rectifiers, 28, 30, 32, 36, 38, and 40 is illustrated in the timing diagram of FIG. 12.

Figure 3:
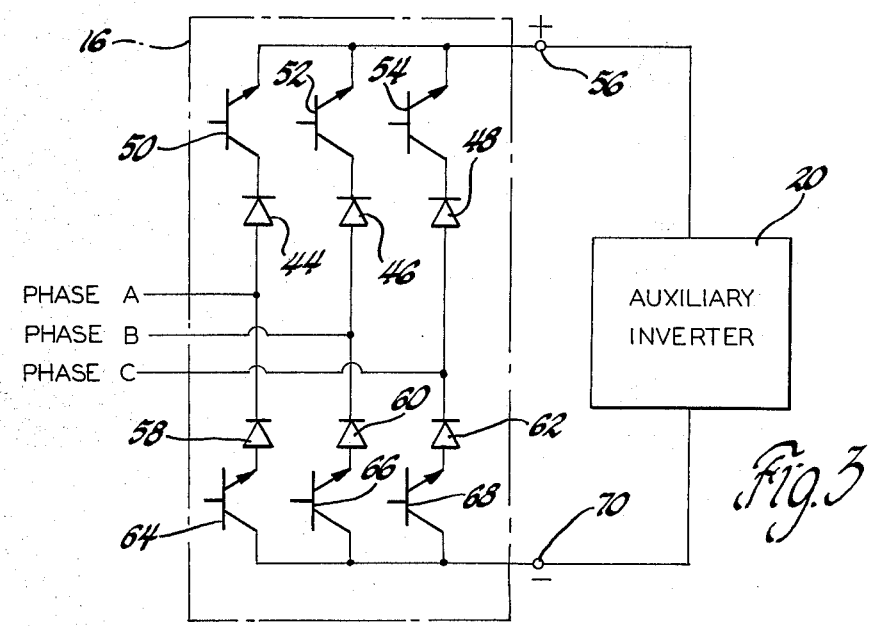
FIG. 3 is a schematic diagram of the auxiliary inverter line selector of FIG. 1.

Referring to FIG. 3, the auxiliary inverter line selector 16 takes the form of a three-phase full-wave bridge rectifier having switched outputs. The auxiliary inverter line selector 16 includes diodes 44, 46, and 48 having their cathodes coupled to the collector electrodes of NPN transistors 50, 52, and 54, respectively. The emitter electrodes of the transistors 50, 52, and 54 are coupled to a positive output terminal 56. The auxiliary inverter line selector 16 further includes diodes 58, 60, and 62 having their anodes coupled to the emitter electrodes of NPN transistors 64, 66, and 68, respectively, and their cathodes coupled to the anodes of the diodes 44, 46, and 48, respectively. The collector electrodes of the transistors 64, 66, and 68 are coupled to a negative output terminal 70. Phases A, B, and C of the three-phase voltage from the three-phase power supply 10 are coupled to the anodes of the diodes 44, 46, and 48, respectively.

Figure 12:
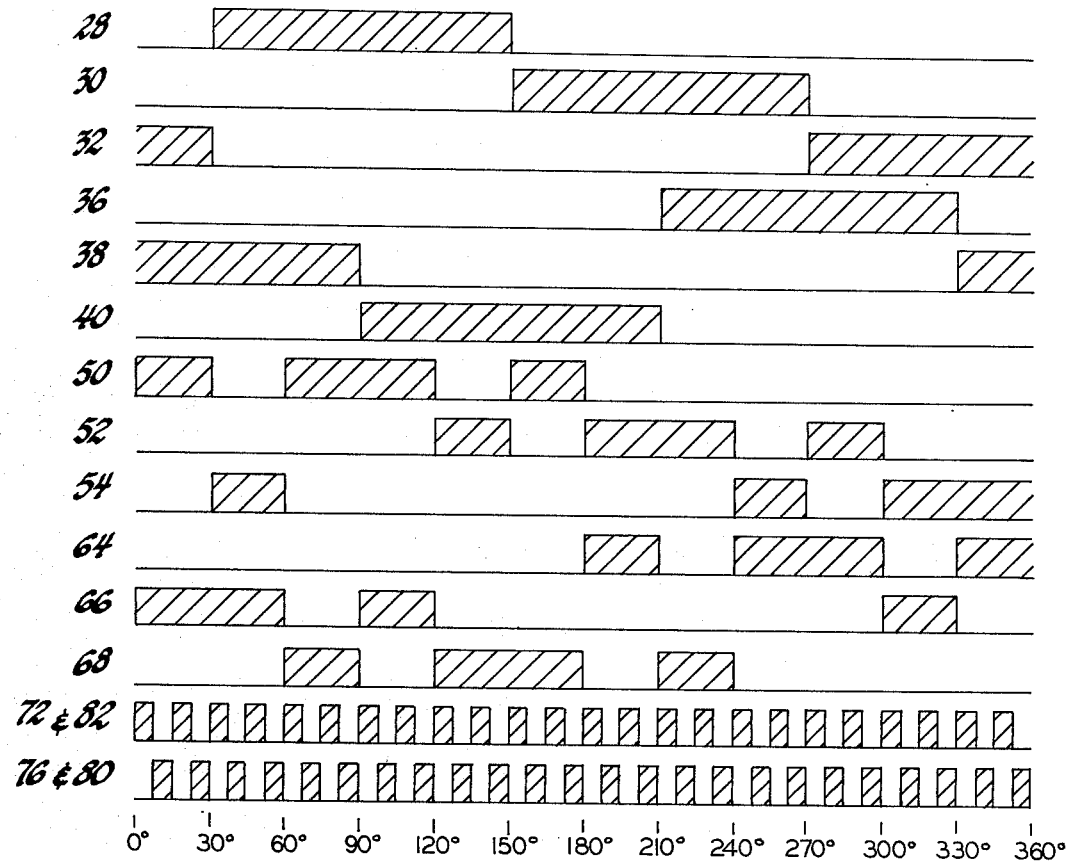
FIG. 12 is a timing diagram for the apparatus of FIG. 1.

The transistors 50, 52, and 54 are selectively biased conductive by conventional floating drive circuits so that each 0° to 30°, 60° to 120° and 150° to 180° segment of each cycle of each phase of the three-phase voltage waveform is coupled to the positive output terminal 56 beginning at each negative to positive transition of the respective phase. The timing logic illustrating the timing periods during which the transistors 50, 52, and 54 are made conductive is illustrated in FIG. 12.

The transistors 64, 66, and 68 are selectively biased conductive by conventional floating drive circuits so as to couple each 180° to 210°, 240° to 300°, and 330° to 360° segment of each cycle of each phase of the three-phase voltage waveform to the negative output terminal 70 beginning with each negative to positive transition of the respective phase. The timing diagram illustrating the conduction periods of the transistors 64, 66, and 68 are illustrated in FIG. 12. The output of the auxiliary inverter line selector 16 across the output terminals 56 and 70 is coupled across the inputs of the auxiliary inverter 20. This output is a floating, unfiltered, unidirectional voltage hereinafter referred to as the auxiliary unidirectional supply voltage.

Figure 8:
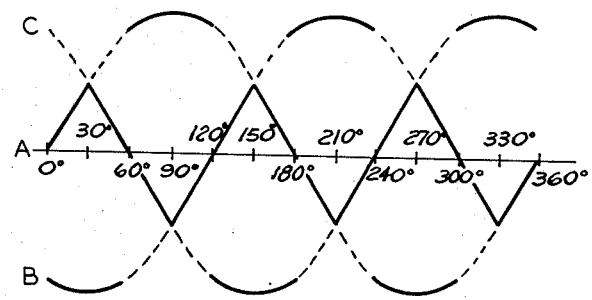
FIG. 8 is a waveform illustrating the portions of the three-phase supply voltage coupled to the auxiliary inverter by the auxillary inverter line selector.

The instantaneous magnitude of the auxiliary unidirectional supply voltage is the difference between the upper solid line and the lower solid line portions of the three-phase voltage waveforms of FIG. 8. At the transition points such as at the 60° point of the three-phase voltage waveform of FIG. 8, one of the output terminals 56 or 70 switches from a relative magnitude of 0.866 to approximately zero and the other of the output terminals 56 or 70 switches from zero to a relative magnitude of 0.866. Therefore, there is no net change in the magnitude of the voltage across the output terminals 56 and 70 at these transition points. The magnitude of the auxiliary unidirectional voltage from across the output terminals 56 and 70 is illustrated in FIG. 11. As can be seen in FIG. 11, the auxiliary unidirectional supply voltage peaks at 60° intervals of the three-phase voltage waveform of FIG. 8 beginning at 30°. A comparison of the waveforms of FIG. 11 shows that the main unidirectional supply voltage peaks when the auxiliary unidirectional supply voltage is at a minimum and the auxiliary unidirectional supply voltage peaks when the main unidirectional supply voltage is at a minimum.

Figure 9:
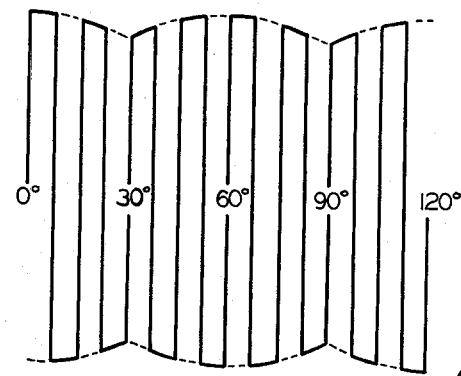
FIG. 9 illustrates the waveform output of the main inverter of FIG. 1.
Figure 10:
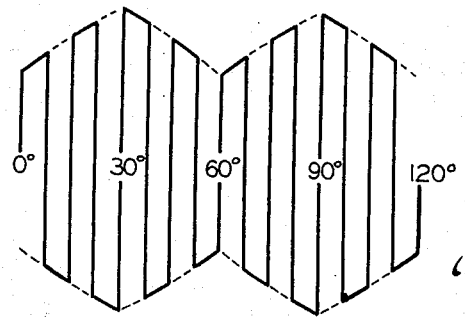
FIG. 10 illustrates the waveform output of the auxiliary inverter of FIG. 1.

The main inverter 18 functions to chop the main unidirectional supply voltage coupled thereto from the main inverter line selector 14 into a high frequency signal having an envelope corresponding to the magnitude of the main unidirectional supply voltage. In like manner, the auxiliary inverter 20 functions in synchronism with the main inverter 18 to chop the auxiliary unidirectional supply voltage coupled thereto from the auxiliary inverter line selector 16 into a high frequency signal having an envelope corresponding to the magnitude of the auxiliary unidirectional supply voltage. The resulting chopped waveforms are illustrated in FIGS. 9 and 10, respectively.

Figure 4:
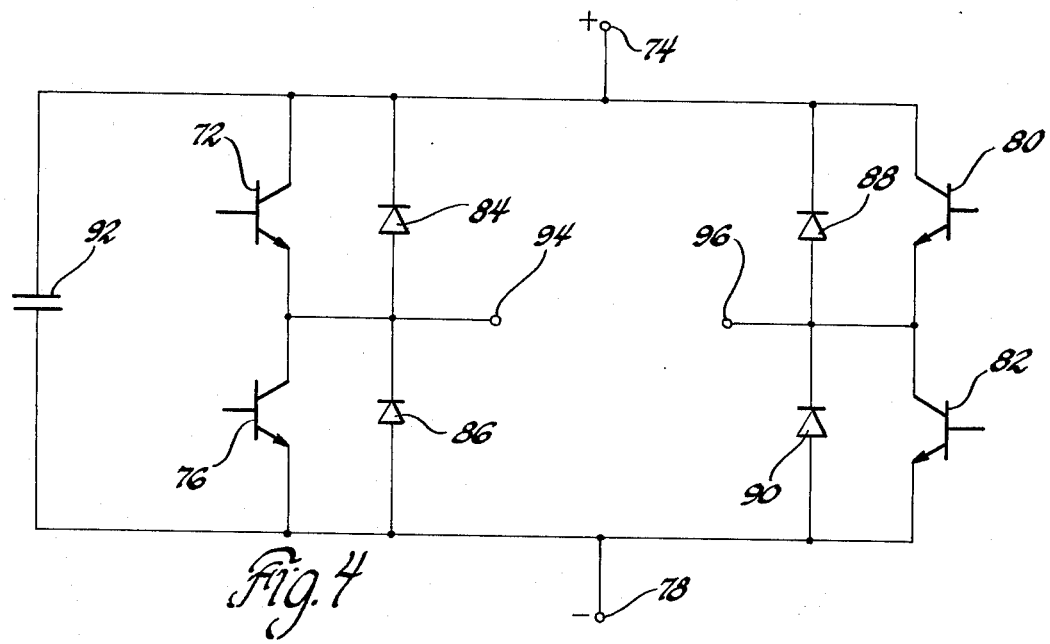
FIG. 4 is a schematic diagram of the preferred embodiment of the main and auxiliary inverters of FIG. 1.

The main inverter 18 and the auxiliary inverter 20 may take any known form. On example of an inverter which may be used is illustrated in FIG. 4. The inverter of FIG. 4 includes an NPN transistor 72 having its collector electrode coupled to an input terminal 74 and its emitter electrode coupled to the collector electrode of an NPN transistor 76. The emitter electrode of the transistor 76 is coupled to a negative input terminal 78. An NPN transistor 80 has its collector electrode coupled to the input terminal 74 and its emitter electrode coupled to the collector electrode of an NPN transistor 82. The emitter electrode of the transistor 82 is coupled to the negative input terminal 78. Diodes 84, 86, 88, and 90 are parallel coupled with the transistors 72, 76, 80, and 82, respectively, the cathodes being coupled to the collector electrode of the transistor parallel coupled therewith. A filter capacitor 92 is coupled between the positive and negative input terminals 74 and 78. The junction between the emitter electrode of the transistor 72 and the collector electrode of the transistor 76 is coupled to an output terminal 94 and the junction between the emitter electrode of the transistor 80 and the collector electrode of the transistor 82 is coupled to an output terminal 96.

By alternately biasing the transistor pairs 72, 82, and 76, 80 conductive at the desired chopping frequency, a voltage applied across the input terminals 74 and 78 is chopped into an alternating signal which is supplied to a load coupled between the output terminals 94 and 96. The envelope of the alternating signal is determined by the magnitude of the voltage applied across the input terminals 74 and 78.

The transistors 72, 76, 80, and 82 are biased conductive by conventional floating drive circuits in accordance with the timing diagram of FIG. 12. Each of the main and auxiliary inverters 18 and 20 are comprised of an inverter as illustrated in FIG. 4. The resulting chopped waveforms from the main and auxiliary inverters 18 and 20 are illustrated in FIGS. 9 and 10, respectively. The main inverter 18 and the auxiliary inverter 20 are operated in synchronism to obtain the synchronism of the waveforms illustrated in FIGS. 9 and 10.

Figure 5:
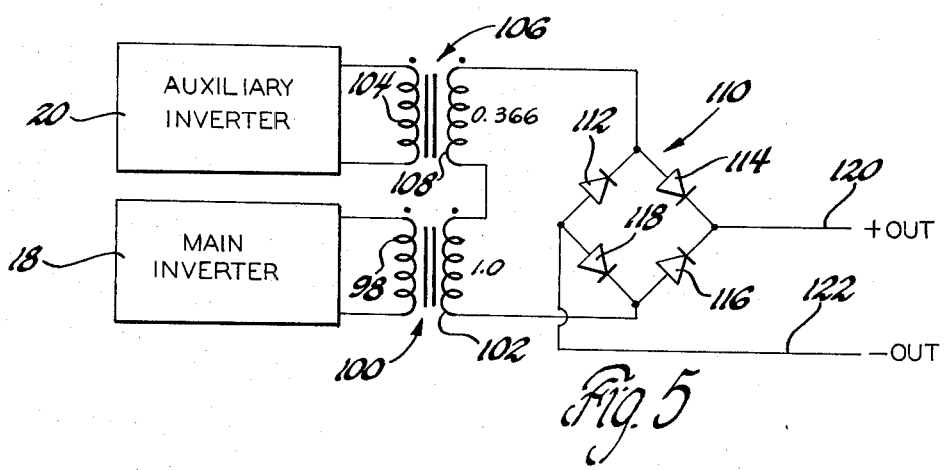
FIG. 5 is a schematic diagram of one embodiment of the transformer and rectifier circuit of FIG. 1.

Referring to FIG. 5, the transformer and rectifier circuit 22 is illustrated. The output of the main inverter 18 is coupled across the primary winding 98 of a main transformer 100 having a secondary winding 102. The output of the auxiliary inverter 20 is coupled across the primary winding 104 of an auxiliary transformer 106 having a secondary winding 108. The secondary windings 102 and 108 of the respective transformers 100 and 106 are series coupled so as to add the magnitudes of the induced voltages therein from the primary windings 98 and 104, respectively. The resultant alternating voltage having the frequency determined by the chopping frequency of the main and auxiliary inverters 18 and 20 is rectified by a full-wave bridge rectifier 110 comprised of the diodes 112, 114, 116, and 118.

The output of the full-wave bridge rectifier 110 on output lines 120 and 122 comprise the system rectified unidirectional output voltage. The rectified unidirectional voltage is a multi-phase rectified voltage which has a ripple at 12 times the fundamental frequency of the three-phase voltage from the three-phase power assembly 10.

As previously described, the main unidirectional supply voltage peaks when the auxiliary unidirectional supply voltage is at a minimum and the auxiliary unidirectional supply voltage peaks when the main unidirectional supply voltage is at a minimum. This provides the opportunity to select the turns ratio of one of the main and auxiliary transformers relative to the other so that the sum of the voltages at these times, e.g., 0°, 30°, 60°, etc., are equal. With the transformer and rectifier configuration of FIG. 5, the proper turns ratio of the auxiliary transformer 106 relative to the main transformer 100 is 0.366 as indicated in the circuit diagram of FIG. 5. With this relationship between the turns ratios, the system rectified unidirectional output voltage takes the form as illustrated in FIG. 11. As can be seen, the system rectified unidirectional output voltage has a frequency equal to 12 times the fundamental frequency and wherein the magnitude of the rectified unidirectional voltage at each 30° point of the three-phase voltage from the three-phase power supply 10 is equal.

Figure 6:
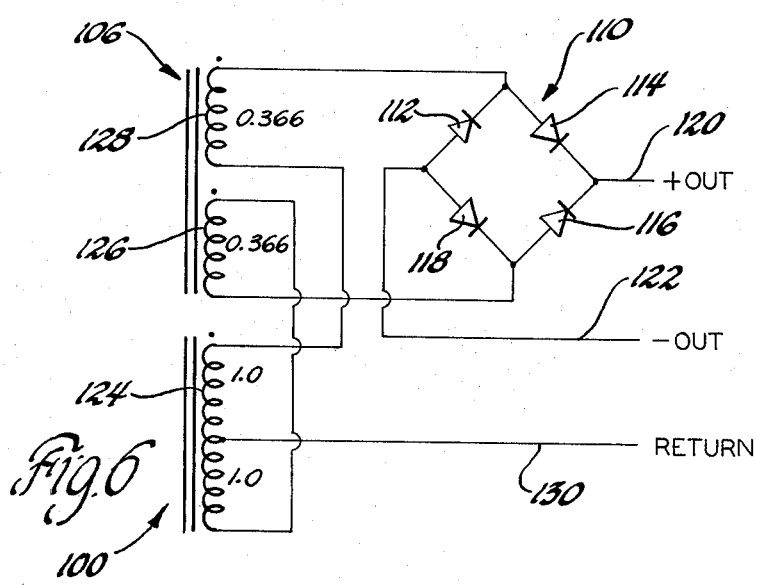
FIG. 6 is a schematic diagram of a second embodiment of the transformer and rectifier circuit of FIG. 1.

If a return line is desired, the main and auxiliary transformers 100 and 106 may take the form as illustrated in FIG. 6 wherein the main transformer 100 has a center tapped secondary winding 124 and the auxiliary transformer 106 includes a secondary winding 126 and a secondary winding 128. A return line 130 is coupled to the center tap of the secondary winding 124. The secondary winding 124 is series coupled between the secondary windings 126 and 128 so that the magnitudes of the respective induced voltages are added. The remaining side of the secondary winding 128 is coupled to one input of the bridge rectifier 110 and the remaining side of the secondary winding 126 is coupled to the remaining input of the bridge rectifier 110. The relative turns ratios of the respective windings are such that the magnitude of the unidirectional output voltage from the full-wave bridge rectifier 110 at each 30° point of the three-phase voltage is equal as illustrated in FIG. 1. The required relative turns ratios is indicated in FIG. 6.

The main inverter line currents, the auxiliary inverter line currents and the net total line currents drawn from the three-phase power supply 10 by the system described are illustrated in FIG. 11. As can be seen, the total line currents is an approximated sinusoidal waveform. Consequently, the total harmonic currents drawn from the three-phase power supply 10 is minimized.

The rectifier system of this invention can be adopted to commonly used multi-phase rectifier arrangements which results in a further reduction in the output ripple, increase in the output ripple frequency and reduction in the harmonic content of the line currents.

Further, in the system described, each of the main and auxiliary transformers are operated at the chopping frequency of the main inverter 18 and the auxiliary inverter 20, which frequency is greater than the frequency of the fundamental waveform of the three-phase voltage from the three-phase power supply 10. This allows a selection of small, lightweight transformers. The preferred embodiment illustrates the chopping of the waveforms from the line selectors 14 and 16 at 15° intervals. The chopping frequency may be any desired frequency and may be based on characteristics of available components and requirements such as efficiency, size and weight.

The system described may also include voltage regulation. For example, pulse width modulation about the center of the pulses in the waveforms of FIGS. 9 and 10 by control of the inverters 18 and 20 in response to supply voltage variations and output voltage variations may be employed.

The auxiliary inverter 20 in the rectifying system of this invention results in the reduction of the peak ripple voltage and the increase in the ripple frequency which decreases the size and weight of the output filters 24 and 26.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A lightweight rectifier for converting a three-phase alternating voltage output from a three-phase supply to a rectified unidirectional output voltage comprising: a three-phase full-wave bridge rectifier coupled with the three-phase supply for converting the three-phase alternating voltage to a main unidirectional supply voltage; a line selector having a pair of output terminals, the line selector including means for coupling the 0° to 30°, 60° to 120° and 150° to 180° segments of each cycle of each phase of the three-phase alternating voltage beginning at the negative to positive transition of the respective phase to one of the output terminals and coupling the 180° to 210°, 240° to 300° and 330° to 360° segments of each cycle of each phase of the three-phase alternating voltage beginning at the negative to positive transition of the respective phase to the other one of the output terminals, the voltage between the pair of output terminals comprising an auxiliary unidirectional supply voltage; a main inverter coupled to the three-phase full-wave bridge rectifier for chopping the main unidirectional supply voltage into a first high frequency voltage waveform; an auxiliary inverter coupled to the output terminals of the line selector for chopping the auxiliary unidirectional supply voltage into a second high frequency voltage waveform at the frequency of the first high frequency voltage waveform and synchronized therewith; transformer means for summing the first and second high frequency voltage waveforms; and a full-wave bridge rectifier coupled to the last mentioned means for rectifying the summed first and second high frequency voltage waveforms and supplying a rectified unidirectional output voltage.

2. A lightweight rectifier for converting a three-phase alternating voltage output from a three-phase supply to a rectified unidirectional output voltage comprising: a three-phase full-wave bridge rectifier coupled with the three-phase supply for converting the three-phase alternating voltage to a main unidirectional supply voltage; a line selector having a pair of output terminals, the line selector including means for coupling the 0° to 30°, 60° to 120° and 150° to 180° segments of each cycle of each phase of the three-phase alternating voltage beginning at the negative to positive transition of the respective phase to one of the output terminals and coupling the 180° to 210°, 240° to 300° and 330° to 360° segments of each cycle of each phase of the three-phase alternating voltage beginning at the negative to positive transition of the respective phase to the other one of the output terminals, the voltage between the pair of output terminals comprising an auxiliary unidirectional supply voltage, the main and auxiliary unidirectional supply voltages alternately having peak magnitudes at 30° intervals of the three-phase alternating voltage; a main inverter coupled to the three-phase full-wave bridge rectifier for chopping the main unidirectional supply voltage into a first high frequency waveform; an auxiliary inverter coupled to the output terminals of the line selector for chopping the auxiliary unidirectional supply voltage into a second high frequency waveform at the frequency of the first high frequency waveform and synchronized therewith; a main transformer having primary and secondary windings; an auxiliary transformer having primary and secondary windings; means coupling the first high frequency waveform across the primary winding of the main transformer; means for coupling the second high frequency waveform across the primary winding of the auxiliary transformer; means coupling the secondary windings of the main and auxiliary transformers in series relationship to sum the voltages induced therein, the resultant magnitude of the summed induced voltages being equal to the sum of the respective magnitudes of the voltages induced into the secondary windings of the main and auxiliary transformers, the main and auxiliary transformers having respective turns ratio so that the magnitude of the summed induced voltages when the first unidirectional supply voltage is at its peak magnitude is equal to the summed induced voltages when the second unidirectional supply voltage is at its peak magnitude; and full-wave bridge rectifying means coupled across the series coupled secondary windings of the main and auxiliary transformers for providing a rectified unidirectional output voltage, whereby the current drawn from the three-phase supply is approximately sinusoidal with low harmonic content.

* * * * *